Aug. 25, 1936.   W. RUNGE   2,051,966
TRANSMITTER AND RECEIVER
Filed Jan. 10, 1934
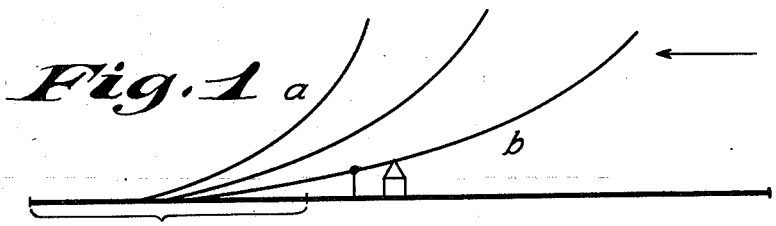
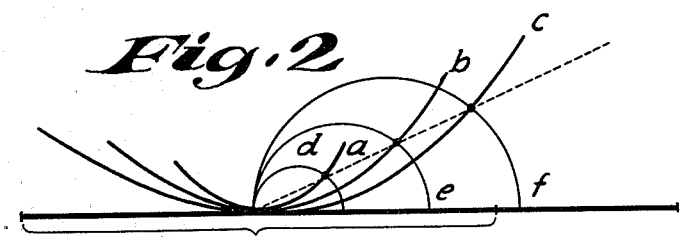
  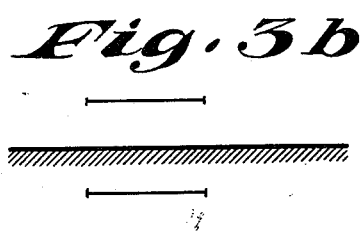
  
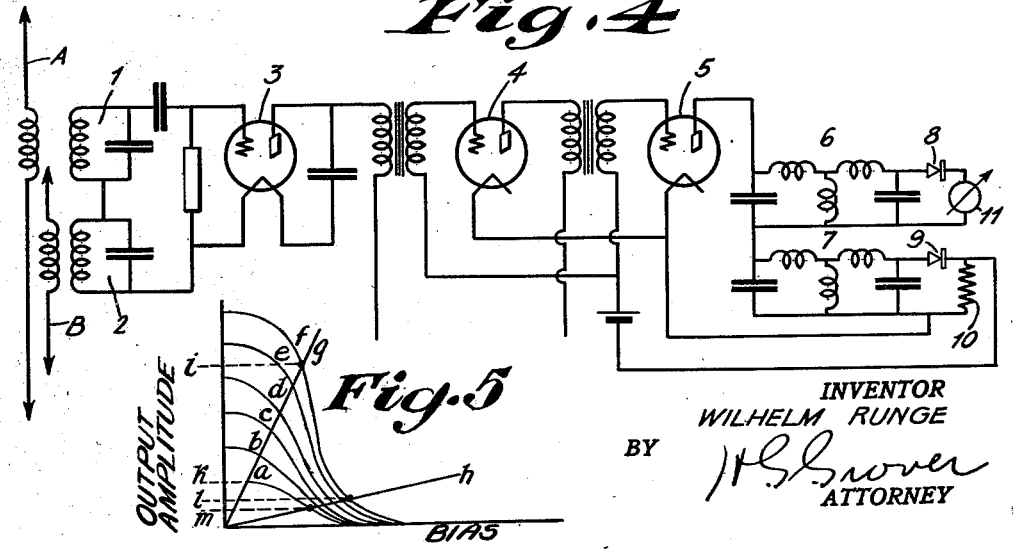
INVENTOR
WILHELM RUNGE
BY
ATTORNEY Patented Aug. 25, 1936

2,051,966

UNITED STATES PATENT OFFICE 2,051,966

TRANSMITTER AND RECEIVER

Wilhelm Runge, Berlin, Germany, assignor to Telefunken Gesellschaft für Drahtlose Telegraphie m. b. H., Berlin, Germany, a corporation of Germany Application January 10, 1934, Serial No. 706,009
In Germany January 17, 1933

7 Claims. (Cl. 250—11)

The present invention relates to a guiding arrangement for the landing of airplanes in foggy weather.

In describing the present invention reference will be made to the attached drawing in which Figures 1, 2 and 3d are curves illustrating the field strength of different types of radiation involved in the present invention;

Figures 3a, 3b and 3c are diagrammatic showings of various radiators which may be used to produce the fields involved;

Fig. 4 is a receiver arranged in accordance with the present invention; while

Fig. 5 is a family of curves illustrating a manner in which the automatic volume control of Fig. 4 acts to produce an output which varies linearly as the amplitude of the input voltages or an output which varies less than linearly with respect to the input voltages.

In order that an airplane may be assured of a safe landing on a flying field or airport under conditions rendering the ground visibility low, it has been suggested in the prior art to provide a radio frequency radiation field over the flying field in such a way that a definite line of constant field intensity from an altitude where the airplane is safe to operate, say 200 meters, leads down on a gentle slope as far as the flying field. See Proc. I. R. E., April 4, 1931, page 585. This method has an inherent drawback in that it presupposes in the airplane a receiver whose sensitiveness must be independent of all variable influences and agencies, especially battery voltage and properties of the tubes. For whenever the sensitiveness of the receiver has noticeably diminished, the airplane will naturally travel along a line of high field intensity. Such a line is indicated by a curve $a$ of Figure 1. This line $a$ involves an unduly high gradient and to travel along the same is not free from risk. But if the receiver has an unduly high sensitiveness, the airplane will travel along a line of unduly low field intensity such as indicated at $b$ of Figure 1. This line is extremely close to the ground and it fails to furnish sufficient safety against possible collisions between the airplane and trees or buildings or other superstructures in the neighborhood of the airport. The production of receivers whose responsiveness or sensitivity is sufficiently independent of fluctuations of the battery and of the properties of the tubes is attended with serious difficulties. Particularly is this so here since the present purpose requires a very high reliability of the receiver arrangement.

Now, according to the present invention the aforementioned difficulties are obviated. The airplane is not required to fly along a line of constant field intensity, but preferably travels along a line where the relationship of two field intensities is constant. The two fields of different character and different frequency are produced by two transmitters of dissimilar frequency and are modulated by different tones. Using a receiver with two input circuits tuned to the two beacon frequencies, while the amplifying means are joint, it will be seen that a change in the gain in the part of the receiver common to both frequencies will remain without any effect upon the curve of travel or course of the aircraft since said course is a function only of the relation between the two field intensities. Fluctuations in the operating potentials and in the properties of the receiver tubes are therefore without any effect upon the travelling curve characterized by constant field-intensity relations.

Fig. 2 shows an exemplified embodiment of such an arrangement. In the middle of the airport landing field are mounted two transmitters not shown. The first one has an antenna not shown with a dish-shaped vertical characteristic, in other words, the field intensity on the ground is of zero value, but it grows with increasing angle of elevation as shown by curves $a$, $b$ and $c$. The second one of said transmitters is provided with an antenna not shown which produces the usual vertical diagram, i. e., maximum field intensity is on or near the ground and the field intensity decreases with growing angle of elevation as indicated by curves $d$, $e$ and $f$. The surfaces of constant field intensity are spheres for the first-mentioned transmitter which are tangent to or touch the ground at the sending point curves $a$, $b$, $c$, Fig. 2. For the second transmitter the surfaces are halved circles of zero inside diameter which surround the transmitter concentrically, curves $d$, $e$, $f$, Fig. 2.

In the remote field of both transmitters, i. e., at distances which are large compared with the wave-length, the field intensity of both transmitters decreases in inverse proportion to the distance, this holding true for angles of elevation up to say 10 degrees, and these are the only ones of interest in the present instance.

As shown by a simple consideration, the lines of constant field-intensity relation in a vertical plane laid through the sending point are in this instance rectilinear, and these straight lines intersect with the ground at the sending point, and their angle of inclination is a function of the field-intensity ratio. The field-intensity ratio and consequently the angle of inclination may be varied at will by regulating the relative strength of transmission from the transmitter. The transmitters should accordingly each include means for controlling the power output therefrom. Equipping the airplane with a device which allows of the direct reading of the field-intensity ratio permits the airplane to follow or to fly along one of these straight lines up to distances from the transmitter of an order of magnitude equal to the transmitted wave-length. The airplane is at this time so close to the ground that it will be enabled to effect a landing without assistance.

The production of dish-shaped vertical diagrams of the transmitter is feasible in various ways, for instance, by the aid of a vertical antenna whose height is as shown in Figure 3a equal to the length of the wave. The two halves of the antenna have a current "covering" of opposite phase so that the field in the horizontal is compensated. However, under a finite angle of elevation a radiation takes place. In the presence of small angles, the same grows in direct proportion to the angle. A modification consists in the use of horizontal antennae as shown in Fig. 3b in which the mirror picture in the ground is of opposite phase so that again the horizontal radiation along the ground is compensated. With growing angle of elevation, the field intensity grows also in direct proportion. Where ultrashort waves are employed the conductivity of the ground generally is so small compared with the dielectric constant that also where vertical antennae are dealt with there is produced a reflected picture of opposite phase, as shown in Fig. 3c, and thus conforms with the dish-shaped vertical diagram, as shown in Fig. 3d.

The vertical characteristic of the second transmitter may be obtained by a vertical antenna or a loop by the aid of frequencies for which the conductivity of the ground is high in contrast with the dielectric constant so that there results a reflected picture of the antenna of the same phase.

The two transmitters may be mounted in the middle of the airport in order that uniform landing conditions from all sides may be secured. The vertical diagrams of both antennae for all horizontal directions are in this case alike. Where simple vertical antennae are dealt with, this is readily feasible. Using horizontal antennae, a combination of individual antennae concentrically about the transmitters must be provided. When both transmitters are disposed along the edge of the airport approaching and landing is feasible only from a definite direction. In this case however antenna combinations with horizontal and vertical beams and considerable saving of energy are possible.

For the direct indication and reading of the field-intensity ratios, the receiver may be as shown in Fig. 4. Two aerials A and B are coupled to two input circuits 1, 2, respectively, each of which is tuned to one of the respective frequencies. The input circuits 1 and 2 impress energy upon a common demodulator tube 3 followed by audio frequency amplification tubes 4, 5. Both transmitters are modulated by dissimilar audio frequency notes. By audio frequency selection of known construction 6, 7, the two signals are separated at the receiver output and are fed to different rectifiers 8, 9. The rectified current of one of the signals furnishes a fall of potential across a resistance 10 which is utilized as a supplementary grid biasing voltage for the receiver, and which acts as an automatic volume control means in such a way that with growing intensity of this signal the gain of the receiver is diminished to such a point that the output volume of this signal remains constant to a large degree. The other signal is impressed after rectification upon a direct current instrument 11 and inasmuch as the gain is always adjusted automatically in such a way that one signal appears with constant intensity, the said instrument allows of reading the relationship between the other signal and the first signal without any difficulty.

Instead of this method, it is also feasible to modulate both senders with the same sound or note and to key so that while one of the apparatus is spacing, the other one is keying. Equality of field intensity is then perceived in one receiver in the shape of a permanent dash, while predominance of one field intensity is noted from the contrast of the signal pertaining thereto with respect to the less loud background produced by the other signal of less intensity.

While it has so far been presupposed that the indicator device characterizes or indicates a fixed field-intensity relationship and that the surface or plane to be traveled along connects all points of a constant field-intensity ratio, it will be seen that the indicator method could also be modified readily so that the indicated ratio of the field-intensities itself is independent of the amplitude of the signals. In this manner guide courses or surfaces may be obtained whose form, for a definite purpose, may be more advantageous than the form of guide or glide surfaces presenting a constant field-intensity relation. For instance, by adopting ways and means of the said sort, the downwardly directed cone-shaped peak of the glide surface could be rounded with the result that the airplane will be guided down to ground along a path the angle of which with respect to ground grows smaller as the plane approaches ground.

Guide surfaces of this kind can be readily obtained by permitting the volume control to allow the output volume of one of the transmitter signals, for example the one in filter 7, to grow in accordance with a suitable rule or law with the field intensity itself instead of maintaining the same constant or stable. This may be accomplished by choosing the amplification control so that at an increase of the input amplitude of the controlling signal, the output amplitude of the controlling signal slowly increases less than linearly. As a result, the amplification decreases at a slower rate than would conform with the maintenance of the constant volume of the controlling signal. The indications of the instrument 11 (Figure 4) therefore, would gradually become greater, instead of remaining constant, if the aircraft approaches the transmitter along the line of the constant relation of the field strengths of the two radiations. Assuming that the signal controlling the degree of amplification is radiated from the transmitter which produces the field lines corresponding with the diagrams d, e, f (Figure 2), the aircraft in order to obtain a constant indication at the instrument 11, must fly in such manner that the input amplitudes of the transmitter which produces the field lines corresponding with the diagrams a, b, c in Figure 2, are smaller than would be the case if a straight line were followed. If at first the air craft is in the intersection point of lines f and c, a line of flight will then be required, which passes below the intersection point e/b and still further below the intersection point a/d. In this manner, therefore, to maintain a constant deviation of the indicator 11, a line of gliding will be followed which is curved downwards.

The desired property of the amplification control, to either maintain constant the output amplitude to a wide degree, while the input amplitude increases, or to furnish a small increase of the output amplitude at an increase of the input amplitude, can be attained in the following manner.

The accompanying Figure 5 shows the output volume of tube 5, (ordinates) supplies to rectifier 9 as a function of the grid bias, (abscissae) impressed from 9, 10, upon tubes 4—5 this output volume being represented in this figure by the curves a, b, c, d, e, f corresponding with the various constant input voltages.

If the resistor 10 has a small value, large output amplitudes will produce only comparatively small voltages at the resistor 10. The voltage at the resistor 10 (abscissae) in relation to the output amplitude of tube 5 (ordinate) thus will approximately correspond with the straight line g. If, on the other hand, the resistor 10 has a very high value, the grid bias as a function of the signal amplitude reaching the rectifier 9 and produced at this resistor, will correspond with the straight line h. Since, however, this voltage at resistor 10, itself influences the output amplitude, the output amplitude, in the case g and at a varying input amplitude will likewise vary between the values i and k, i. e., about 1 to 4, while in the case h, it will vary between the values l and m, i. e., at about 20%. In suitably selecting the resistor 10, it is thus possible to dimension for almost constant output voltage (resistor 10 large, straight line of resistor h, amplitude variations l to m about 20%, gliding accordingly to Figure 2 practically in a straight line), or to dimension for an output voltage that increases at an increase of the input voltage (resistor 10 small, straight line of bias g, variations of the output amplitudes between l and k about 1:4, gliding path in Figure 2 strongly curved). In displacing the straight lines of the bias between g and h, it is possible, if the aircraft starts from the point of intersection fc in Figure 2, to obtain any intermediate position between the straight line gliding path and a gliding path following the curve c.

In order that the work of piloting the airplane towards the sending or beacon point may be facilitated, the airplane could be furnished with directional means such as a coil or loop aerial, and thus take its bearings on the non-directive transmitter. In order that the airport equipment may be as simple as possible it is preferable, however, to make one of two transmitters in such a way that it will characterize a beacon by ways and means well known in the art, for instance, by that it is given a pronounced horizontal directional diagram the direction of which is fixed by the aid of a suitable signal rhythm. For definite directions, there will then prevail for such a transmitter equality of the field-intensity, whereas, in the presence of departures therefrom, the signal rhythm will appear in the positive or in the negative sense.

Having thus described my invention and the operation thereof, what I claim is:

1. The method of guiding an aircraft to a landing field along a desired path which includes the steps of, producing a spherical shaped energy field tangent at its outer periphery to the landing field and, superposing on said spherical field a second field such that points of equal intensity in said fields approach the ground along the desired path.

2. The method of guiding an aircraft to a landing field along a desired path which includes the steps of, producing a spherical shaped energy field tangent at its outer periphery to the landing field, superimposing on said spherical field a second field a vertical section through which is semi-circular in shape and which has its diameter parallel to the ground, the individual intensities of said fields being such that points of equal intensity in said fields approach the ground along the desired path.

3. A system for guiding an aircraft to a safe landing on an aircraft field including transmitting means having a first radiator comprising a vertical aerial the length of which is equal to a wave length of the energy to be transmitted therefrom, and a second vertical aerial the length of which is equal to one-half the wave length of the energy to be transmitted therefrom, said aerials being located on said landing field and energized to produce radiant energy fields which overlap, receiving means comprising a rectifier tube, a pair of circuits connected with the input electrodes of said tube, said circuits being tuned to different radio frequency waves corresponding to the energy of said two fields, a thermionic amplifier tube coupled with the output electrodes of said rectifier tube and a pair of filter circuits coupled to the output electrode of said amplifier tube.

4. The method of guiding an aircraft to ground along a desired path which includes the steps of, producing two radiant energy fields which are superimposed in such a manner that points of equal intensity in said fields fall along a path which approaches the ground at a predetermined rate and reaches the ground at the desired point, receiving energy from both of said fields, amplifying said received energy to the same degree, producing indications characteristic of the energy of one of said fields, producing energy characteristic of the energy of the other of said fields, and utilizing the last produced energy to control the degree of amplification of the received energy.

5. A method as recited in claim 4 in which said last named produced energy is used to control the amplification of the received energy non-linearly.

6. The method of guiding an aircraft to a landing field along a desired path which includes the steps of, producing a dish-shaped energy field tangent at its outer periphery to the landing field, superimposing on said dish-shaped field a second field, a vertical section through which is semi-circular in shape and which has its diameter parallel to the ground and its periphery tangent to a line through the axis of said dish-shaped field, the individual intensities of said field being such that points of equal intensity in said fields approach the ground along the desired path.

7. A receiver adapted when located on an airplane to guide said plane along a curved path formed by two intersecting fields of radiant energy, one of which fields is spherical-shaped with its periphery tangent to the surface of the landing field, the other of which is semi-circular in shape with its diameter parallel to the landing field, the individual intensities of said fields being such that points of equal intensity in said fields approach the ground along a straight path comprising in combination, a thermionic tube having input and output electrodes, circuits connected with the input electrodes for applying thereto energy from both of said fields, a thermionic amplifier having input and output electrodes, circuits coupling said input electrodes of said amplifier to the output electrodes of said first named tube, a filter circuit and an indicator connected with the output electrodes of said tube, a filter circuit terminating in a resistance coupled with the output electrodes of said amplifier tube, and a connection between said resistance and the input electrodes of said amplifier tube, whereby the amplification of said tube is controlled by the current flowing in said resistance.

WILHELM RUNGE.